No. 649,117. Patented May 8, 1900.
W. H. STRUTT.
VEHICLE WHEEL.
(Application filed Apr. 7, 1900.)
(No Model.)

Witnesses:
John Becker.
William Schulz.

Inventor:
William Henry Strutt
by his attorneys
Roeder & Briesen

UNITED STATES PATENT OFFICE.

WILLIAM HENRY STRUTT, OF NEW YORK, N. Y., ASSIGNOR OF ONE-HALF TO ALFRED REEVES, OF SAME PLACE.

VEHICLE-WHEEL.

SPECIFICATION forming part of Letters Patent No. 649,117, dated May 8, 1900.

Application filed April 7, 1900. Serial No. 11,950. (No model.)

*To all whom it may concern:*

Be it known that I, WILLIAM HENRY STRUTT, a citizen of the United States, and a resident of New York city, county and State of New York, have invented certain new and useful Improvements in Vehicle-Wheels, of which the following is a specification.

This invention relates to an improved wheel for automobiles and other vehicles, and particularly to the means for securing the elastic tire to the felly. By my invention the tire is securely attached in such a manner that it cannot become displaced during wear and that its resiliency is in no wise impaired.

Figure 1:
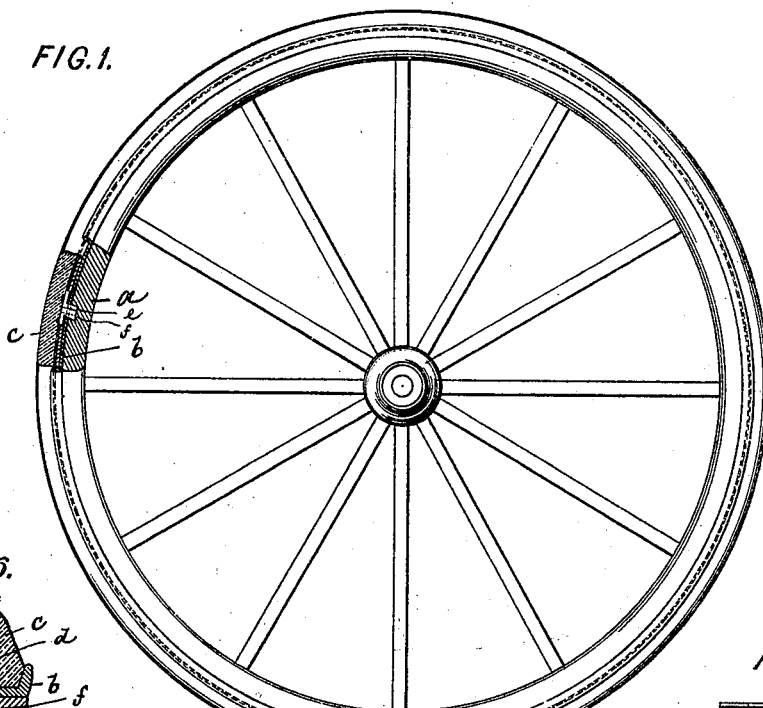
Figure 6:
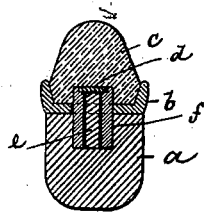
Figure 5:
Figure 2:
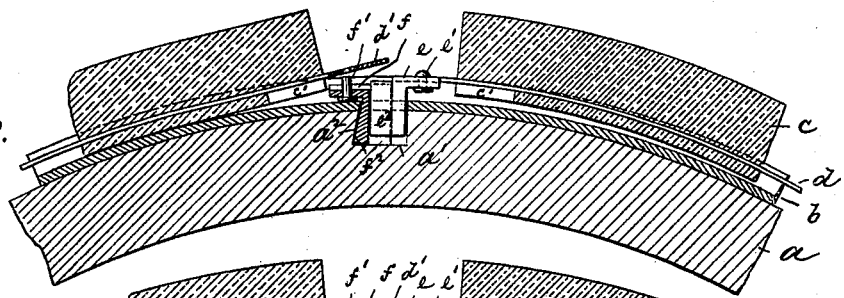
Figure 3:
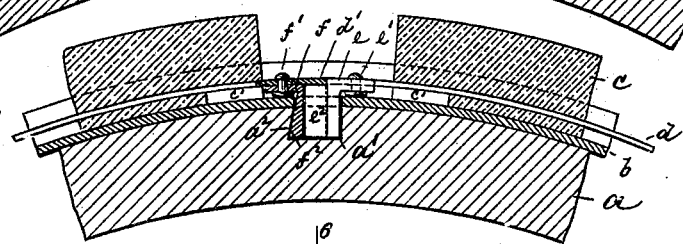
Figure 4:
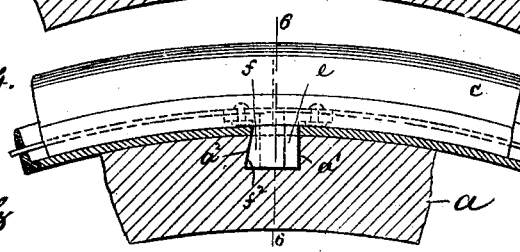

In the accompanying drawings, Figure 1 is a side view, partly in section, of my improved vehicle-wheel. Fig. 2 is a longitudinal section through a portion of the wheel, showing the position of the parts before the strap is riveted to the plug $f$; Fig. 3, a similar section showing the position of the parts after the strap has been riveted to the plug; Fig. 4, a side view, partly in section, of a portion of the wheel, showing the fastening closed; Fig. 5, a plan of the plugs $e\,f$; and Fig. 6, a cross-section on line 6 6, Fig. 4.

The letter $a$ represents the felly of a wheel, having the flanged rim $b$, upon which the rubber or other resilient tire $c$ is seated. The tire $c$ is perforated longitudinally for the reception of a metal tape or strap $d$, the ends of which are adapted to be locked to the felly, so as to secure the tire in place.

The mechanism for locking the strap to the wheel consists, essentially, of two angular and preferably flanged plugs $e$ and $f$, Figs. 2 and 5, which are provided, respectively, with a tongue and groove and are adapted to be dovetailed together. The male plug $e$ is riveted to one end of the strap $d$ by rivet $e'$ and the female plug $f$ is riveted to the other end of the strap by a rivet $f'$, which is set back some distance from the end of the strap. Thus the free end $d'$ of the strap $d$ overlaps the tongue $e^2$ of plug $e$ when the fastening is closed, and thereby prevents it from unlocking. The lower ends or shanks of the plugs $e\,f$ are received within a mortise $a'$ of felly $a$, which is undercut along one face, as at $a^2$, to interlock with a corresponding wedge-shaped face $f^2$ of the female plug $f$.

To apply the tire $c$ to the wheel, the strap $d$ is drawn through the tire, with the male plug $e$ attached to one of its protruding ends. Then the tire is laid around the wheel, and the plugs $f\,e$ are successively fitted into the mortise $a'$, so that they interlock and that the rivet $f'$ projects up from plug $f$, Fig. 2. The strap $d$ is next riveted to the plug in such a manner that the free end $d'$ of the strap overlies tongue $e^2$, and thereby locks the male plug to the female plug, the latter being in turn locked to the felly by means of the undercut mortise, Fig. 3. In this way all the parts of the fastening are securely connected. Finally the ends of the tire $c$ are drawn together over the fastener and are cemented together, when the operation of putting the tire upon the wheel is completed. In order to accommodate the upper portions of the plugs $e\,f$, the adjoining ends of the tire $c$ are cut away, as at $c'$.

My improved tire-fastening possesses a number of advantages. It is quickly applied, holds the tire immovably without interfering with its elasticity, and does not impair the appearance of the wheel. Furthermore, it prevents the tire from creeping around the channel, which renders the invention particularly applicable to automobile wheels, and, finally, a new tire may be readily applied by opening the ends of the old tire and cutting off the head of the rivet $f'$.

What I claim is—

1. A vehicle-wheel having a mortised felly, a resilient tire, a strap engaging the same, and a pair of interlocking plugs secured to the strap and adapted to be received within the mortise of the felly, substantially as specified.

2. A vehicle-wheel composed of a felly having an undercut mortise, a resilient tire, a strap engaging the same, and a pair of interlocking plugs secured to the strap, one of said plugs being wedge-shaped so as to interlock with the undercut mortise, substantially as specified.

3. A vehicle-wheel composed of a mortised felly, a resilient tire, a strap engaging the same, interlocking male and female plugs, of which the female plug is secured to the strap at a distance from its end so that the free end of the strap projects over the tongue of the male plug, substantially as specified.

4. A vehicle-wheel composed of a felly having an undercut mortise, a resilient tire, a strap engaging the same, a pair of interlocking plugs secured to the strap, the female plug being wedge-shaped to interlock with the undercut mortise, and the male plug being locked to the female plug by the end of the strap which projects over said male plug, substantially as specified.

Signed by me at New York city, county and State of New York, this 5th day of April, 1900.

WILLIAM HENRY STRUTT.

Witnesses:
F. HULBERG,
WILLIAM W. WHITE.